(12) United States Patent
Yan et al.

(10) Patent No.: US 7,685,527 B2
(45) Date of Patent: Mar. 23, 2010

(54) METHOD AND APPARATUS FOR CONTROLLING VIEW NAVIGATION IN WORKFLOW SYSTEMS

(75) Inventors: Heung-Wah Yan, Redwood City, CA (US); Daqing Zhang, Foster City, CA (US); Duane Wandless, Bloomsbury, NJ (US)

(73) Assignee: Siebel Systems, Inc., San Mateo, CA (US)

( * ) Notice: Subject to any disclaimer, the term of this patent is extended or adjusted under 35 U.S.C. 154(b) by 920 days.

(21) Appl. No.: 10/234,397

(22) Filed: Sep. 3, 2002

(65) Prior Publication Data

US 2007/0240046 A1    Oct. 11, 2007

Related U.S. Application Data

(60) Provisional application No. 60/331,872, filed on Nov. 20, 2001.

(51) Int. Cl.
   *G06F 3/048* (2006.01)
(52) U.S. Cl. ................ 715/762; 715/763; 715/765; 715/771; 715/809; 715/810; 715/967
(58) Field of Classification Search ........... 715/772, 715/762, 763, 769, 780, 843, 809, 810, 967, 715/765, 771; 705/9, 7; 700/97; 717/104

See application file for complete search history.

(56) References Cited

U.S. PATENT DOCUMENTS

| 5,774,661 | A | * | 6/1998 | Chatterjee et al. | 709/203 |
| 5,999,911 | A | * | 12/1999 | Berg et al. | 705/9 |
| 6,725,428 | B1 | * | 4/2004 | Pareschi et al. | 715/530 |
| 2002/0077842 | A1 | * | 6/2002 | Charisius et al. | 705/1 |
| 2002/0093537 | A1 | * | 7/2002 | Bocioned et al. | 345/777 |
| 2003/0158832 | A1 | * | 8/2003 | Sijacic et al. | 707/1 |

* cited by examiner

*Primary Examiner*—Namitha Pillai
(74) *Attorney, Agent, or Firm*—Campbell Stephenson LLP

(57) ABSTRACT

Embodiments of an apparatus, method, and article of manufacture for controlling view navigation in a workflow environment are disclosed herein. View navigation is controlled by incorporating and utilizing a user-interact operation in a workflow editing application. A workflow process designer may define the user-interact operation from one or more pre-designed views provided for the particular business objectives associated with the workflow process. In one embodiment, users may be navigated to specific views to gather information necessary to the completion of the workflow process, or to facilitate the processing of information across the workflow process to accomplish the business objectives embodied in the workflow process.

13 Claims, 12 Drawing Sheets

METHOD AND APPARATUS FOR CONTROLLING VIEW NAVIGATION IN WORKFLOW SYSTEMS

CROSS-REFERENCE TO RELATED APPLICATION

This application is related to provisional application Ser. No. 60/331,872, filed Nov. 20, 2001, and titled METHODS AND APPARATUS FOR CONTROLLING VIEW NAVIGATION IN WORKFLOW SYSTEMS. The benefit of the filing date of the above-identified application is hereby claimed pursuant to 35 U.S.C. §119 (e)(1).

TECHNICAL FIELD

This disclosure relates to workflow management systems, and more particularly, but not exclusively, to an apparatus, method, and article of manufacture for controlling view navigation in a workflow environment by incorporating a user-interact operation into a process definition tool to navigate a user to one or more views within a workflow process instance.

BACKGROUND INFORMATION

The growth of the Internet has brought about a transformation in the protocols and business processes used by organizations to interact with and communicate with their customers or potential customers. Organizations that provide goods and/or services to consumers increasingly turn to workflow management systems to define or redefine their business processes in terms of workflow in order to be more accessible to their online customers, and to facilitate a more stream-lined and convenient mechanism with which to communicate with consumers, or to process data or other information within the organization.

Workflow generally refers to the movement of documents and/or tasks through a business process, or a set of logically related operations performed to accomplish a defined business objective. By incorporating the business process into a workflow process, the efficiency of the business process may be enhanced because the workflow process promotes consistency and adherence to policies by automatic enforcement of business procedures. A workflow process may be designed to achieve a particular end for an external customer, or to facilitate interaction and communication between internal individual units of an organization. Workflow processes are generally defined in terms of beginning and end units, and intervening activities, which, when logically linked together create the workflow process. Examples of workflow processes include managing a new service request, processing an incoming customer order, creating a marketing plan, or the like.

Workflow management systems permit organizations to define and control the various activities associated with a particular business process. A number of process-modeling techniques are available to define the sequence of routing and processing requirements of a typical workflow process and to facilitate the design and implementation of workflow capabilities within an organization. For example, a decision-chain process model comprises a technique that utilizes milestones and decision points to map out the workflow process, while an event-flow process model depicts the workflow process as a chain of manual and automatic rule-based events.

One type of workflow management system utilizes the Internet to implement workflow processes to achieve various business objectives, such as processing customer orders, managing customer service requests, and the like, for example. Systems utilizing the Internet to implement workflow capabilities typically use web clients and servers to deliver their functionality. One disadvantage associated with current Internet or web-based workflow management systems is that a relatively high level of skill may be required to develop and deploy elements of the workflow system. For example, implementation of a workflow process utilizing the Internet may require the independent development of web pages and/or java applications to create views or web pages to gather and manipulate information essential to the successful completion of the workflow process. Even with these skills, an organization is likely to see an increase in development time, maintenance costs, and the time required to make changes and enhancements to existing workflow processes when attempting to integrate these components with a workflow process produced with a workflow editing software application, for example. In addition, having a variety of independently constructed interfaces may cause difficulty in coordinating workflows across different execution environments, thereby necessitating specific training or computer programming skills to implement the desired workflow process.

In situations in which an organization has a large database of products, a complicated sales cycle comprising a large number of customized forms, pricing tables, and the like, or has other business practices in place with which they would like to integrate the electronic aspects of doing business over the Internet, for example, the level of skill required to implement a workflow process will increase in proportion to the complexity.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of an apparatus, method, and article of manufacture for controlling view navigation in a workflow environment via incorporation and utilization of a user-interact operation into a process definition tool are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide an apparatus and method to control view navigation in a workflow environment by incorporating a user-interact operation into a workflow editing application (also referred to as a "process definition tool") to navigate a user to one or more views within a workflow process instance. A system administrator, for example, may design a workflow process to include one or more user-interact operations to control the navigation of a user, whose input may be necessary in order to proceed with the workflow process instance. By defining a view or views associated with each user-interact operation in the workflow process, and the flow of events conditioned on a user's actions in interaction with the defined view(s), the workflow process may be designed to gather and process information more efficiently without requiring the system administrator to develop and implement a variety of desired views or applets necessary to accomplish the business objectives embodied in the workflow process. Other features of the illustrated embodiments will be apparent to the reader from the foregoing and the appended claims, and as the detailed description and discussion is read in conjunction with the accompanying drawings.

Figure 1:
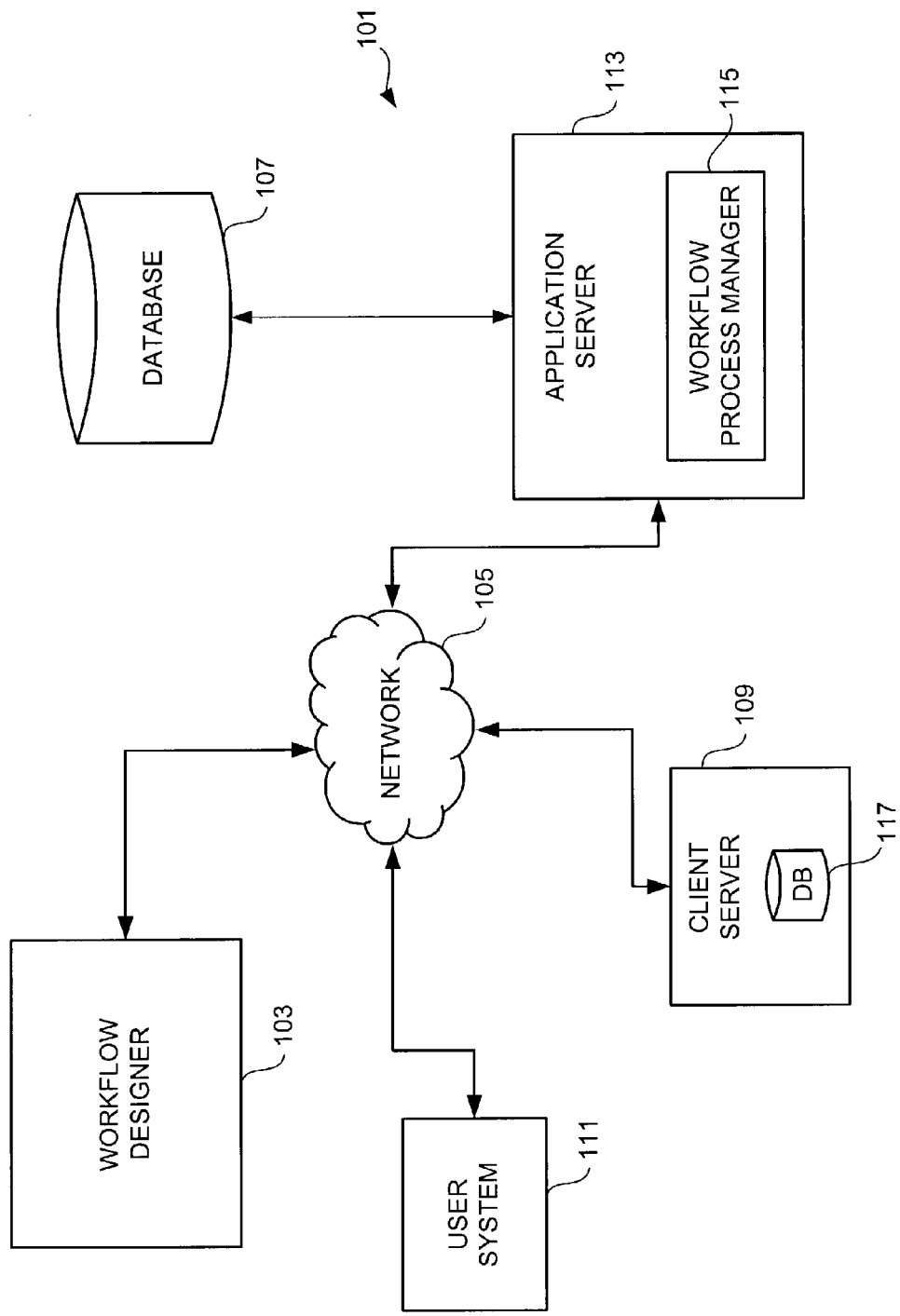
FIG. 1 is a block diagram illustrating one embodiment of a workflow management system environment in accordance with an embodiment of the present invention.

Referring now to the drawings, and in particular to FIG. 1, an embodiment of a workflow management system environment 101 is shown in accordance with an embodiment of the present invention. As illustrated in the depicted embodiment, a workflow designer 103, a user system 111, a client server 109, which may include, or be coupled to, a client database 117, and an application server 113 are each capable of being interconnected with one another through a network 105. The application server 113 includes, in one embodiment, a workflow process manager 115, and may be connected to a database 107 in an embodiment.

The network 105 may be any type of communications network through which a plurality of different devices may communicate, such as for example, but not limited to, a public switched telephone network ("PSTN"), the Internet, an intranet, an extranet, a wide area network ("WAN"), a local area network ("LAN"), or other network or combination of networks to provide a platform for communication among various networks, or between any of the illustrated components connected to the network(s), or other components. The links between the various components illustrated in FIG. 1 and the network 105 may be wireless radio frequency ("RF") links in a format, such as for example, but not limited to, known amplitude, frequency, or phase modulated signals, other electromagnetic signals which travel through the atmosphere, such as for example, satellite transmissions or free-space optical communications, or the links may comprise physical connections, such as for example, fiber optic cables, or the like.

The workflow designer 103 may comprise a system (e.g., a computer) operated by a system administrator to design and define a workflow process to embody a particular set of business objectives in order to facilitate handling inputs and/or events from one or more user systems 111. In one embodiment, the workflow process may comprise a series of defined operations, which, when linked together in a logical fashion, emulate the business process to achieve the particular set of business objectives for an organization. The user system 111 may comprise a personal computer, a personal digital assistant ("PDA"), a mobile phone, or other electronic equipment capable of connecting to the network 105 via a communications link.

The functionality of the workflow designer 103 may be embodied in the form of a workflow editing application, for example, maintained in the database 107, or other storage device, accessible by the application server 113, in one embodiment. The workflow editing application generally comprises a graphical or textual tool to define a business process. In defining the business process, each activity within the process is associated with a person or an application, for example, and rules are created to govern how the activities progress across the workflow, and how each activity is implemented (e.g., to which view a user will be navigated by implementation of a user-interact operation). The rules, which define each operation of the workflow process, are created for each operation to regulate how workflow-related data is to be processed, routed, tracked, and controlled. For example, one rule might generate an e-mail notification when a condition has been met. Another rule might implement conditional routing of documents based on the content of fields. The structure and composition of these rules will be discussed in greater detail hereinafter in conjunction with an explanation of how a process designer defines attributes associated with each operation of a workflow process.

Workflow processes designed and defined by the system administrator, or other individual, via the workflow designer 103 may be stored in the database 107 until a user input from the user system 111 activates an instance of the workflow process. Each workflow process instance may be managed by the workflow process manager 115 of the application server 113, in an embodiment. In one embodiment, when a completed workflow process is submitted to the application server 113 for storage in the database 107, the workflow process may be compiled into a set of machine-readable instructions capable of being executed by a machine to implement the workflow process operations when the defined input conditions are satisfied.

The operations of the workflow process designed and defined with the workflow designer 103 may provide access to various systems, applications, or products used by the organization to conduct its business. These various systems, applications, and/or products may be stored on a database (e.g., client database 117) accessible by the client server 109, a database (e.g., database 107) accessible by the application server 113, or other storage location. For example, a workflow process instance being managed by the workflow process manager 115 may interact with the client server 109 to retrieve or store information in the client database 117, such as product lists, external customer profiles, or pricing information, in an embodiment. In other embodiments, the client server 109 may provide access to other systems utilized by an organization, such as for example, but not limited to, document management systems, office automation products, e-mail applications, or other applications, systems, or products that may be utilized by, or integrated into, the workflow process to accomplish the desired business objectives.

Figure 2:
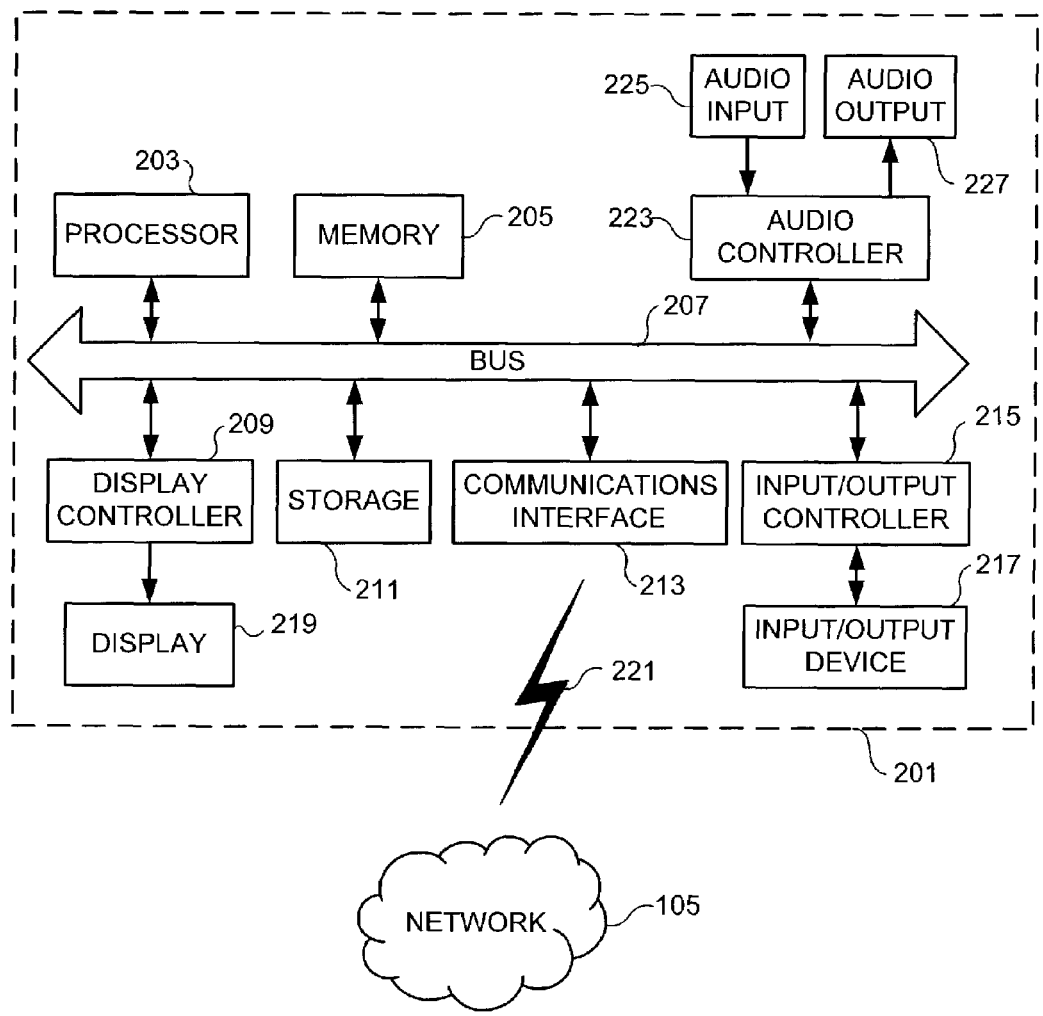
FIG. 2 is a block diagram of one embodiment of a computer system representative of a workflow designer, user system, or server in accordance with an embodiment of the present invention.

FIG. 2 is a block diagram illustrating one embodiment of a machine 201 that may be used for the workflow designer 103, the user system 111, the client server 109, or the application server 113 in accordance with an embodiment of the present invention. Typically, the workflow designer 103 may use various types of machines, including a desktop computer or a workstation, or laptop computer, for example, while the user system 111 may use various types of machines, such as for example, a PDA, a personal computer, a wireless phone, or other electronic equipment capable of receiving and/or transmitting signals via the network 105. The machine used for the client server 109 or the application server 113 will typically comprise a computer server or similar type of server hardware that is designed to communicate with a plurality of other machines. In one embodiment, the machine 201 is a computer that includes a processor 203 coupled to a bus 207. In one embodiment, a memory 205, a storage 211, a display controller 209, a communications interface 213, an input/output controller 215, and an audio controller 223 are also coupled to the bus 207.

In one embodiment, the machine 201 interfaces to external systems through the communications interface 213. The communications interface 213 may include a radio transceiver compatible with various modulated signals, wireless telephone signals, or the like. The communications interface 213 may also include an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 221 is received/transmitted between the communications interface 213 and the network 105. In one embodiment, the communications signal 221 may be used to interface the machine 201 with another computer system, a network hub, a router, or the like.

In one embodiment, the processor 203 may be a conventional microprocessor. The memory 205 may be a machine-readable medium such as dynamic random access memory ("DRAM"), and may include static random access memory ("SRAM"). The display controller 209 controls a display 219, which in one embodiment may be a cathode ray tube ("CRT"), a liquid crystal display ("LCD"), an active matrix display, a television monitor, or the like. An input/output device 217, coupled to the input/output controller 215 may be a keyboard, a disk drive, a printer, a scanner, or other input/output device, including a television remote, a mouse, a trackball, a trackpad, a joystick, or the like. In one embodiment, the audio controller 223 controls an audio output 227, which may include for example, audio speakers, headphones, an audio receiver, an amplifier, or the like. In one embodiment, the audio controller 223 also controls an audio input 225, which may include for example, a microphone, or input(s) from an audio or musical device, or the like.

The storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of embodiments of the present invention. The term "machine-readable medium" shall be understood to include, for example, solid-state memories; ROM; random access memory ("RAM"); magnetic disk storage media; optical storage media; flash memory devices; electrical, optical, acoustical.

Figure 3:
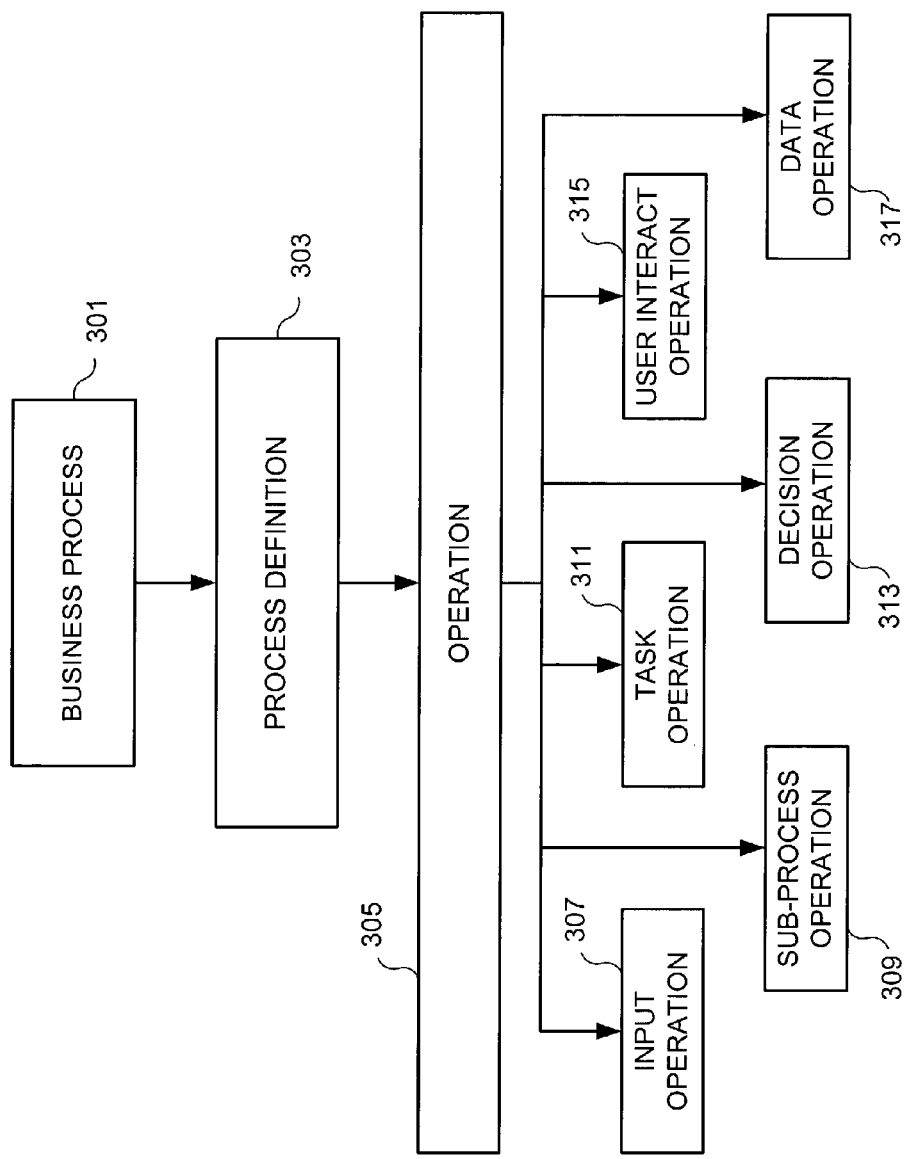
FIG. 3 is a block diagram illustrating one embodiment of a hierarchical relationship among various components of a workflow process to define a business process in accordance with an embodiment of the present invention.

With reference now primarily to FIG. 3, the hierarchical relationship between a business process 301 and the components of a process definition 303 are illustrated in block diagram form. The business process 301 is generally associated with one or more operational objectives of an organization, such as for example, processing a customer's online order, managing a service request, or the like. The business process 301 may comprise a set of one or more linked procedures, which are designed to collectively realize the operational objectives with which the business process 301 is associated. The process definition 303 may be a representation of the business process 301, which may be structured as a sequence of operations 305 via a workflow management system utilizing a workflow editing application in one embodiment, as mentioned previously. The operations 305, comprising the process definition 303, indicate when the business process 301 begins and ends, and provide information about activities within the business process 301 in an embodiment. The workflow editing application may comprise a series of user-interface views, such as those illustrated in FIGS. 4A through 10, in an embodiment, to facilitate the design and definition of a workflow process to achieve the operational objectives of the organization. FIGS. 4A-10 will be discussed in greater detail hereinafter.

Figure 4A:
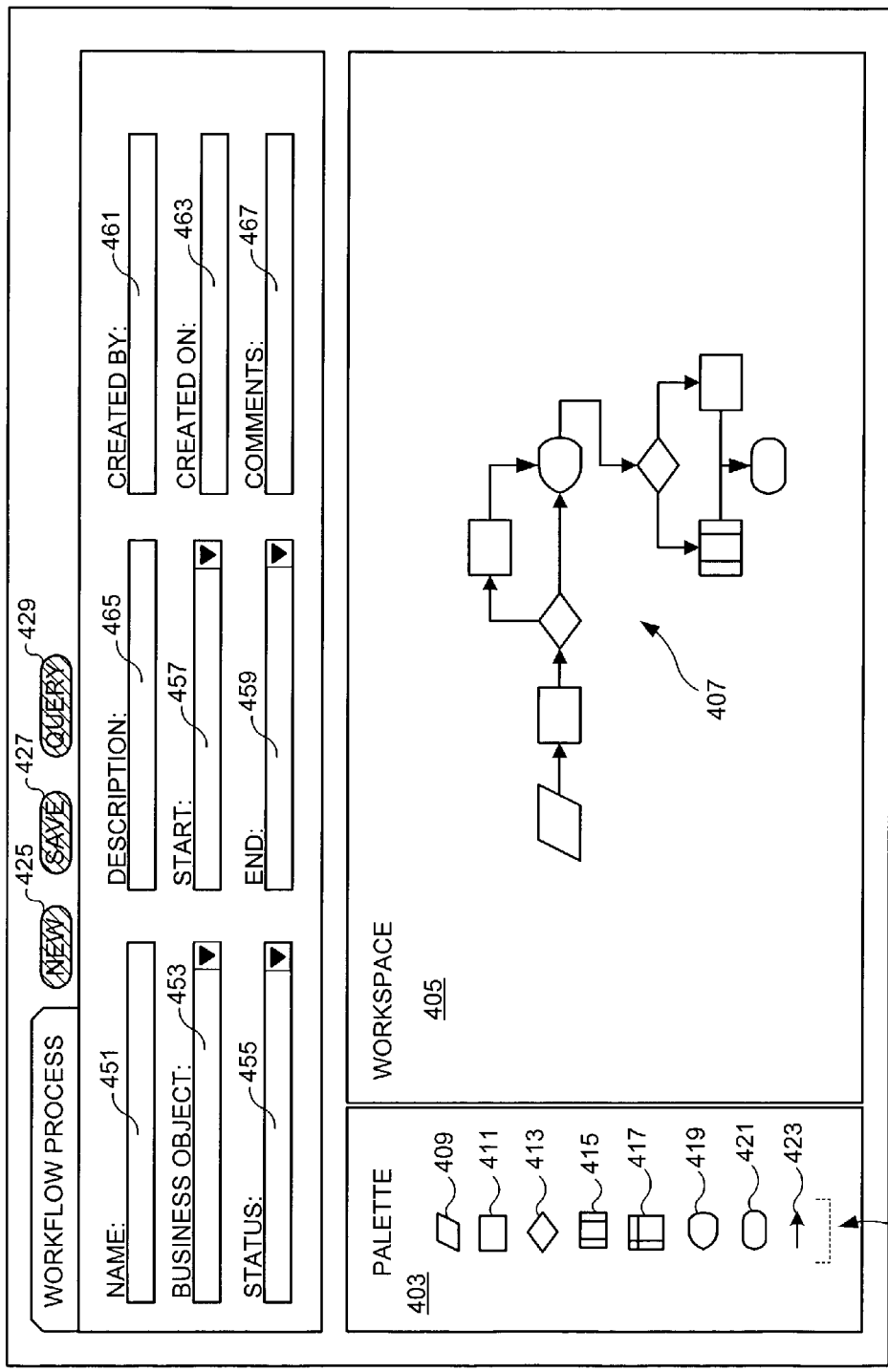
FIG. 4A is an illustration of an example user-interface display showing a flowchart view of an example workflow editing application to design a workflow process in accordance with an embodiment of the present invention.

Any number of different types of operations 305 may be used to design the workflow process, including for example, but not limited to, an input operation 307, a sub-process operation 309, a task operation 311, a decision point operation 313, a user-interact operation 315, a data operation 317 or the like, in various embodiments. Each operation 305 of the process definition 303 may be represented by one or more flowchart shapes 401 (see, e.g., FIG. 4A) included in a palette 403 of an example workflow editing application, in an embodiment. FIG. 4A illustrates an example user-interface display showing a flowchart view of the workflow editing application. A user may utilize the workflow editing application provided via the user-interface display illustrated in FIG. 4A to design a workflow process, in an embodiment. The user of the workflow editing application, such as a system administrator for example, may "drag and drop" the flowchart shapes 401 onto a workspace 405, as illustrated in FIG. 4A, to design the workflow process (e.g., the flow diagram having reference numeral 407). It will be appreciated that the respective flowchart shapes are arbitrarily assigned to represent a specific type of operation, and are shown as an example only.

With continued reference to FIG. 3, the input operation 307 may be used to define the conditions that must be met in order to initiate an instance of the workflow process. When the conditions have been met, the workflow process instance may be initiated under the management of the workflow process manager 115 (see, e.g., FIG. 1), in an embodiment. The input operation 307 may be represented by the flowchart shape having reference numeral 409 (see, e.g., FIG. 4A), in an embodiment. It will be appreciated that there may generally only be one input operation 307 per process definition 303.

The sub-process operation 309 may itself comprise a business process that has been embedded into another business process 301 as part of the process definition 303. There may be one or more sub-process operations 309 in a given process definition 303. It will be appreciated that in one embodiment, one may design and define each desired sub-process 309 as a process definition 303 itself in the manner described herein, and then incorporate that sub-process 309 into a higher level process definition 303, which itself may also be a sub-process operation 309 of an even higher level process definition 303. The sub-process operation 309 may be represented by the flowchart shape having reference numeral 415 (see, e.g., FIG. 4A), in an embodiment.

The task operation 311 may define an activity (e.g., a business service) that may be executed as part of the process definition 303 during a workflow process instance. There may be one or more task operations 311 within a process definition 303. In one embodiment, the task operation 311 may comprise one or more business services, such as for example, a notification, an assignment, an external program call, or the like. For instance, the notification may comprise an e-mail, a page, a fax, or a message, for example, sent to a user or to another individual or entity, or the like, defined by the workflow process. In one embodiment, the assignment may comprise assigning one or more employees or positions to an object making its way through the workflow process, or the like, for example, while the external program call may comprise an action that will launch an external application, such as for example, an external e-mail application. It will be appreciated that, in another embodiment, the business services (e.g., the notification, assignment, external program call, or the like) may comprise individual sub-tasks linked to the task operation that may be defined by specifically adapted user-interface displays.

In different embodiments, the business services of the task operation may comprise manual interactions, or may comprise automated functions performed by the application server 113 (see, e.g., FIG. 1) for example. The task operation 311 may be represented by the flowchart shape having reference numeral 411 (see, e.g., FIG. 4A), in an embodiment. In other embodiments, the various business services (i.e., sub-tasks) associated with the task operation 311 may be represented by different flowchart shapes.

The decision operation 313 comprises an operation in the process definition 303 in which the workflow process may branch off to different operations depending on a set of conditions defined for the decision operation 313. From the decision operation 313, the workflow will follow one of several branches in the process definition 303, depending on the defined conditions and the status of the workflow. One or more decision operations 313 may be utilized in the process definition 303. The decision operation 313 may be represented by the flowchart shape having reference numeral 413 (see, e.g., FIG. 4A), in an embodiment.

The user-interact operation 315 comprises an operation in the process definition 303 that provides the ability to navigate a user to a specified view, wait for an event to occur, and then continue the workflow process instance based on the event occurrence. In one embodiment, the view may be selected from a pull-down menu of available web pages and views, as will be discussed in greater detail hereinafter, thereby alleviating many of the aforementioned problems associated with web-based workflow systems. The user-interact operation 315 may be represented by the flowchart shape having reference numeral 419 (see, e.g., FIG. 4A), in an embodiment.

The data operation 317 comprises an operation in the process definition 303 that provides the ability to manipulate data within the workflow process instance, for example, by inserting, updating, or deleting a business component record or field, in an embodiment. The data operation 317 may be represented by the flowchart shape having reference numeral 417 (see, e.g., FIG. 4A), in an embodiment.

With reference now primarily to FIG. 4A, the remaining two items included in the illustrated palette 403 are a connector 423 and an end designator 421, each of which is relatively self-explanatory. The connector shape 423 may be used to connect each of the other flowchart shapes together in the workspace 405 to create the workflow process 407. The end designator 421 may be used to represent the completion of the workflow process 407. As the workflow process 407 is designed on the workspace 405, each operation in the workflow process 407 must be defined in order to provide substance to the sequence of process definition operations. In one embodiment, the workflow editing application may be configured to allow a user to select an operation of the workflow process 407, and define a set of attributes for the operation by selecting items from a plurality of pull-down menus, for example. It will be appreciated that additional flowchart shapes, representing other types of operations or actions, may also be incorporated into the palette 403 for use in designing workflow processes. For example, one embodiment may incorporate a wait operation flowchart shape that may be used to represent an operation that specifies when a workflow process instance should pause in execution, and the duration of the pause. In other embodiments, a stop operation may be used to specify conditions that cause the workflow process instance to terminate prior to completion. The stop operation may also be represented by a unique flowchart shape. In still other embodiments, an exception operation may be incorporated into the workflow editing application to allow a process designer to specify when a workflow process instance should follow an alternative branch, such as for example, in the case of a system generated error.

Figure 4B:
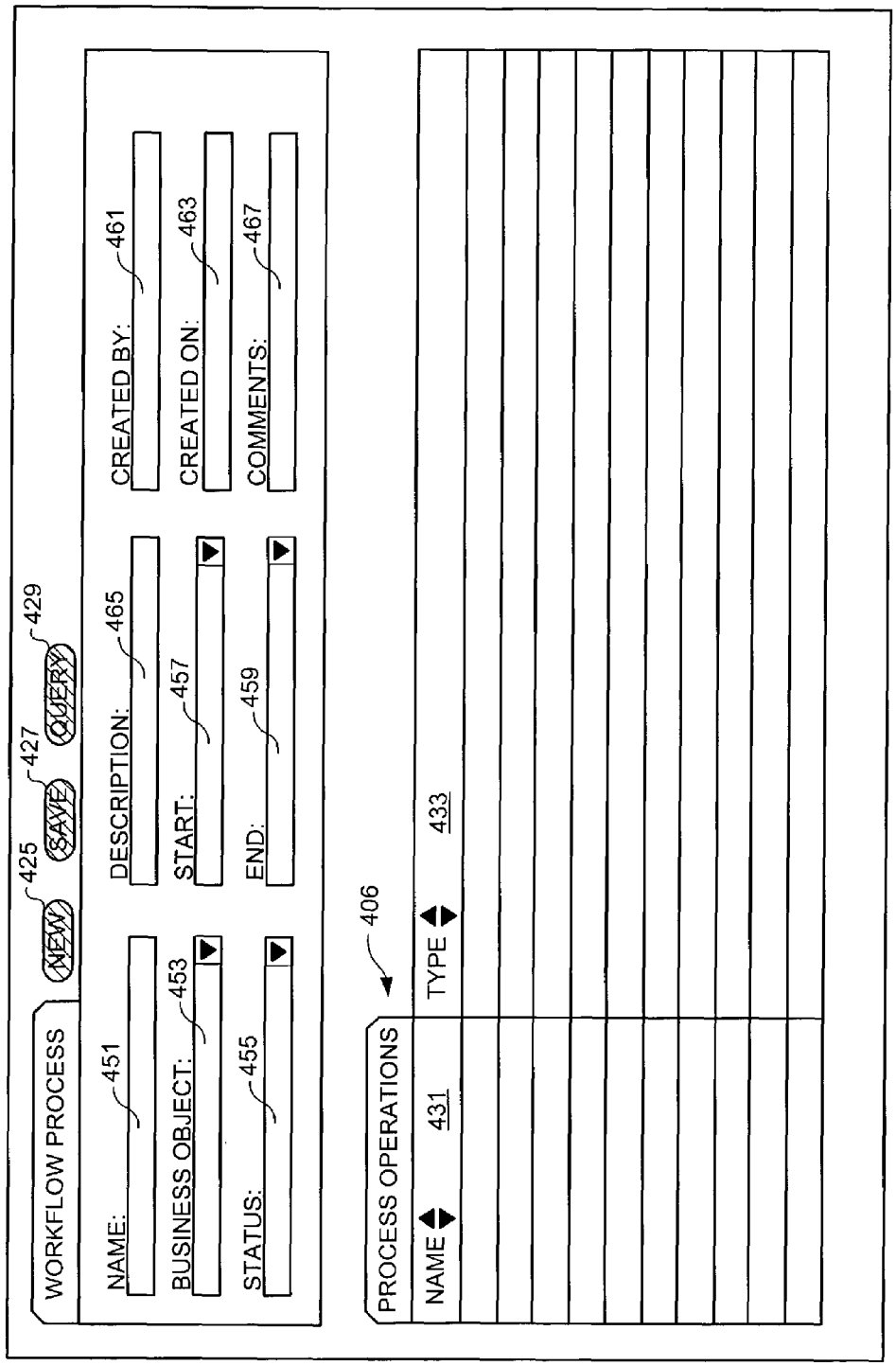
FIG. 4B is an illustration of an example user-interface display showing a process administration view of the example workflow editing application illustrated in FIG. 4A in accordance with an embodiment of the present invention.

FIG. 4B illustrates an example user-interface display showing a process administration view of the example workflow editing application illustrated in conjunction with FIG. 4A. A process designer, such as a system administrator for example, may toggle between the two views illustrated in FIGS. 4A and 4B to see a flowchart view of the workflow process 407, or textual view of the sequence of operations making up the workflow process 407. In the illustrated embodiment shown in FIG. 4B, the palette 403 and the workspace 405 (see, e.g., FIG. 4A) are replaced by a process operations list applet 406, including a list of all operations (e.g., by Name 431 and Type 433) that comprise the workflow process (e.g., the workflow process 407, FIG. 4A). As used herein, reference to a first user-interface and a second user-interface may refer to separate displays, separate sections of a single display, or to a single display configured to perform the functions described in conjunction therewith.

By selecting an operation in the workflow process, either by selecting a flowchart shape from the workspace 405 illustrated in FIG. 4A, or by selecting an operation from the list applet 406 in the display illustrated in FIG. 4B, a process designer may define a set of attributes to be associated with that operation. FIGS. 5-10 illustrate example administration views that allow a process designer to define attributes of an input operation 307, a decision operation 313, a user-interact operation 315, a sub-process operation 309, a task operation 311, and a data operation 317, respectively (see, e.g., FIG. 3). In one embodiment, the applicable administration view may be displayed for a selected operation based on the operation's "type," for example "user-interact operation." Similarly, in embodiments in which the business services associated with the task operation 311 comprise individual sub-tasks linked to the task operation 311, attributes of the individual sub-tasks may be defined via specifically tailored administration views based on the "type" of each respective sub-task (e.g., notification, assignment, external program call, or the like).

The process definition views illustrated in FIGS. 4A and 4B include a number of data fields in which information may be entered by the process designer, or in which information will be pre-populated at the time the workflow process is designed. For example, in one embodiment, a "Name" field 451 allows the process designer to input a unique name to identify the workflow process under design. In one embodiment, a "Business Object" field 453 allows the process designer to select from a pull-down menu of enabled business objects, such as for example, but not limited to, an "Order Entry," or a "Service Request." In one embodiment, the business object field 453 may be populated with the same business object for each operation in the workflow process. Each business object represents a specific feature of doing business that may be monitored. The selected business object determines which workflow conditions are available throughout the workflow process, as will be discussed in greater detail hereinafter.

In one embodiment, a "Status" field 455 allows the process designer to select from a pull-down menu, the status of the workflow process in terms of completeness or accessibility by the workflow process manager 115 (see, e.g., FIG. 1). For example, the pull-down menu associated with the "Status" field may comprise a list including "Inactive," "In Progress," "Verified," and/or "Active" to describe the status of the particular workflow process, in an embodiment. In one embodiment, if the workflow process is designated as "Inactive," it becomes read-only and is ignored by the workflow process manager 115. If the workflow process is designated as "In Progress," it may be edited, but will be ignored by the workflow process manager 115, in an embodiment. A designation of "Verified," indicates that the workflow process has been checked by a responsible party, and represents a valid process definition, but will be ignored by the workflow process manager 115. In one embodiment, if the workflow process is designated as "Active," it becomes read-only and is monitored by the workflow process manager 115.

In one embodiment, a "Start" field 457 and an "End" field 459 allow a process designer to set an activation date and an expiration date, respectively, for the workflow process, by selecting an item from a pull-down menu. In one embodiment, a "Created By" field 461 may be pre-populated with the creator's login, and a "Created On" field 463 may be pre-populated with the date/time that the workflow process was created. In addition, an embodiment may include a "Description" field 465 in which the process designer may enter a more detailed description of the workflow process, and a "Comments" field 467 in which the process designer may input any additional comments with regard to the workflow process. In one embodiment, a "NEW" button 425, a "SAVE" button 427, and a "QUERY" button 429 allow a process designer to create a new workflow process, save a current workflow process, or retrieve a previously created workflow process, respectively. It will be appreciated that additional information or data fields may also be incorporated into the user-interface displays, and the illustrated embodiment is intended as an example only.

With reference now primarily to FIGS. 5-10, example administration views for defining each of the various operations of a workflow process described above are illustrated in accordance with an embodiment of the present invention. As mentioned previously, each operation in the workflow process may be defined by a set of rules in order to provide functionality to the workflow process, and to regulate how activities progress across the workflow and how each activity is implemented.

In an embodiment of the present invention, rules comprise workflow conditions and workflow actions. Workflow conditions may be circumstances or situations that cause something to happen (i.e., a triggering event). Workflow actions may be events invoked by the fulfillment of a workflow condition. When a workflow condition is met, the workflow action occurs. In one embodiment, each workflow condition may include one or more condition clauses that specify an object attribute and a value with which the object attribute's value will be compared to determine whether or not the condition has been satisfied. Likewise, each workflow action may include one or more action clauses that specify the actions that will occur if the workflow condition is met.

In one embodiment, a workflow condition expresses an object/attribute relationship to a value. For example, a workflow condition may target data such as Service Request severity. The workflow condition compares that data to a value, such as 1-Critical, 2-High, 3-Low, or the like. The combination of the data element (e.g., Service Request severity), a comparison operation (e.g., =), and the value (e.g., 1-Critical) make up the workflow condition. In some circumstances, the value element of the workflow condition may be an issue only if the workflow condition remains unsatisfied for some period of time. Under these circumstances, a duration may be set for the workflow condition, and any workflow actions dependant upon the workflow condition will not be executed until the workflow condition is met for the specified duration. For example, the Service Request severity data element comparison to a value of 1-Critical may be an issue only if the workflow condition remains valid for some period of time, for example, two hours. In this case, a duration of two hours may be set, and will become a part of the workflow condition, so that if the workflow condition does not remain "True" for the duration, the workflow action (e.g., notify a supervisor) will not be executed.

Each of the embodiments of the administration views illustrated in FIGS. 5-10 may include several of the same data fields as discussed previously in conjunction with FIGS. 4A and 4B (e.g., the business object field 453, the description field 465, the created by field 461, and the created on field 463). Each administration view for defining a particular operation may also include a "Name" field 501 in which the process designer may input a unique name to identify the particular operation. In one embodiment, the information input into the "Name" field 501 may also appear inside the flowchart shape representing the corresponding operation in the flowchart view of the workflow editing application illustrated in FIG. 4A, and in the "Name" column 431 of the process operations list applet 406 illustrated in FIG. 4B. For example, if the name given to the input operation (e.g., by entering information into the "Name" field 501) is "Create Order," then the flowchart shape corresponding to the input operation in the workflow process 407 (see, e.g., FIG. 4A) may contain the words "Create Order" (see also, e.g., FIG. 11, which illustrates an example workflow process as it may appear on the workspace 405 of the flowchart view of the example workflow editing application).

In addition, each administration view for defining the various workflow process operations may also include a "Workflow Process" field 515 that may correspond to the name of the workflow process created in conjunction with the user-interface displays illustrated in FIGS. 4A and 4B (e.g., via the "Name" field 451). Moreover, each administration view for defining the various workflow process operations may include a "RETURN TO DESIGNER" button 505, linking each respective administration view with the corresponding flowchart view user-interface display (see, e.g., FIG. 4A) and/or the corresponding process administration view user-interface display (see, e.g., FIG. 4B) associated with the applicable workflow process, in an embodiment.

Figure 5:
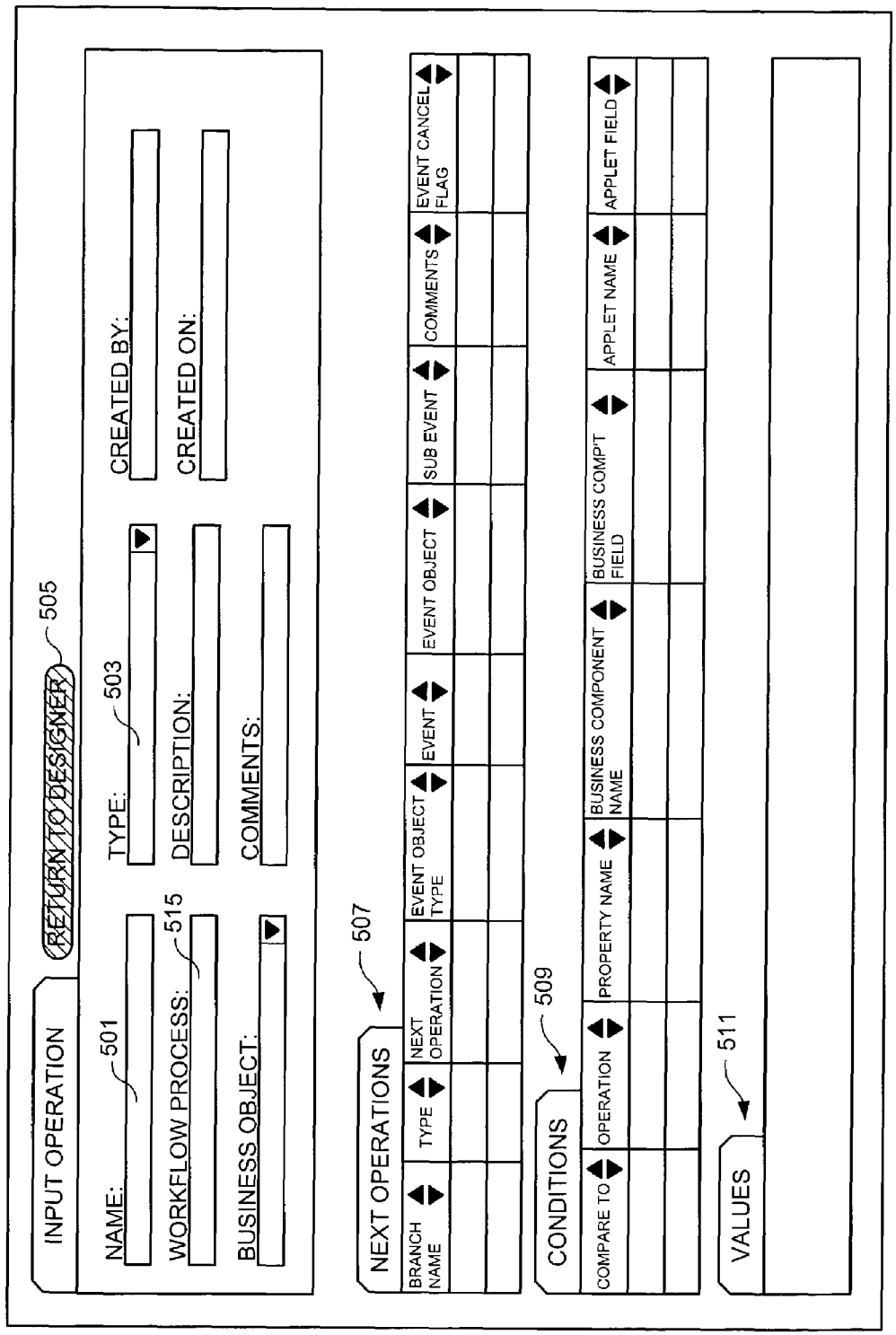
FIG. 5 is an illustration of an example user-interface display showing an administration view of the example workflow editing application to define an input operation of the workflow process in accordance with an embodiment of the present invention.

With reference now primarily to FIG. 5, an example user-interface display in which the process designer may enter information to define an input operation 307 (see, e.g., FIG. 3) for a workflow process is shown in accordance with an embodiment of the present invention. As mentioned previously, in one embodiment, the process designer may select an operation in the workflow process by selecting (e.g., via a double click) a flowchart shape from the workspace 405 in the flowchart view illustrated in FIG. 4A, or by selecting an operation from the list applet 406 in the operations administration view illustrated in FIG. 4B. The appropriate administration view for each operation may be automatically displayed based upon the selected operation's "type" (see, e.g., the "Type" field 503), in an embodiment.

In one embodiment, an input operation may be similar to a decision operation, and may incorporate a number of branches for the workflow to follow based on the input conditions. In one embodiment, the input operation administration view (see, e.g., FIG. 5) may comprise a next operations applet 507, a conditions applet 509, and a values applet 511. This series of applets allow the process designer to define the possible next operations to follow the input operation, and define conditions and values that may determine which next operation will be undertaken. In some cases, only one next operation may be defined, in which case the branch is merely a default that will be followed in every instance of the workflow process. Each branch in the next operations applet 507 may be defined by a unique name, and be designated by type, such as for example, a condition branch, which depends on one or more conditions, a default branch, which will be followed in the event that no conditions are satisfied for a condition branch, or a connector branch, for which no conditions are permitted.

The conditions applet 509 may be configured to permit a process designer to indicate where a comparison value is coming from, and the operation that will be used for the comparison. The comparison value may come from a business component for example, such as for instance "Service Request severity," as mentioned previously. The operation may indicate that, for example, one value must match, that all values must match, that none of the values may match, or the like, in order for the condition to be satisfied. The values applet 511 may be configured to be dynamic, based on where the comparison is coming from, as indicated in the conditions applet 509. For example, if the comparison is coming from the "Service Request severity" component, the values applet may be populated with "1-Critical," "2-High," or "3-Low" for each respective branch that will be followed depending on the severity of the service request.

In other instances, only one branch (e.g., a connector branch) will be defined from the input operation. With reference to the workflow process illustrated in FIG. 11, an input operation for an "Order Entry" business object workflow process may be the creation of an order (see, e.g., block 1101), which may launch the execution of the workflow process instance. The input operation may be linked to a user button click of a "Buy" button, for example, on a web-based catalog user-interface, or the like. This user action may initiate execution of the workflow process by the workflow process manager 115 (see, e.g., FIG. 1). In the embodiment of the workflow process illustrated in FIG. 11, only one possible next operation (see, e.g., block 1103) is designed into the workflow process, and consequently, the administration view for the input operation will be defined accordingly.

The "collect order info." block 1103 represents a user-interact operation in the workflow process. The process designer may define the characteristics of the user-interact operation with the administration view illustrated in FIG. 7, for example. The user-interact operation administration view illustrated in FIG. 7 may include many of the same data fields as described previously in conjunction with FIGS. 4A, 4B, and 5. In addition, the illustrated embodiment of the user-interact operation administration view includes a data entry field for selecting a "View" (see, e.g., reference numeral 513) to which the process designer wishes a user to be navigated during a workflow process instance when this particular user-interact operation is executed. The view may be selected from a pull-down menu that contains one or more pre-designed views configured to the particular business object (e.g., Order Entry) with which the user-interact operation is associated. The user-interact operation also includes, in an embodiment, the next operations applet 507, the conditions applet 509, and the values applet 511 discussed above, which will permit the process designer to create a number of other possible views to which a user may be navigated based upon the user's interaction with the preceding view, or other next operations that will follow the user-interact operation.

Figure 11:
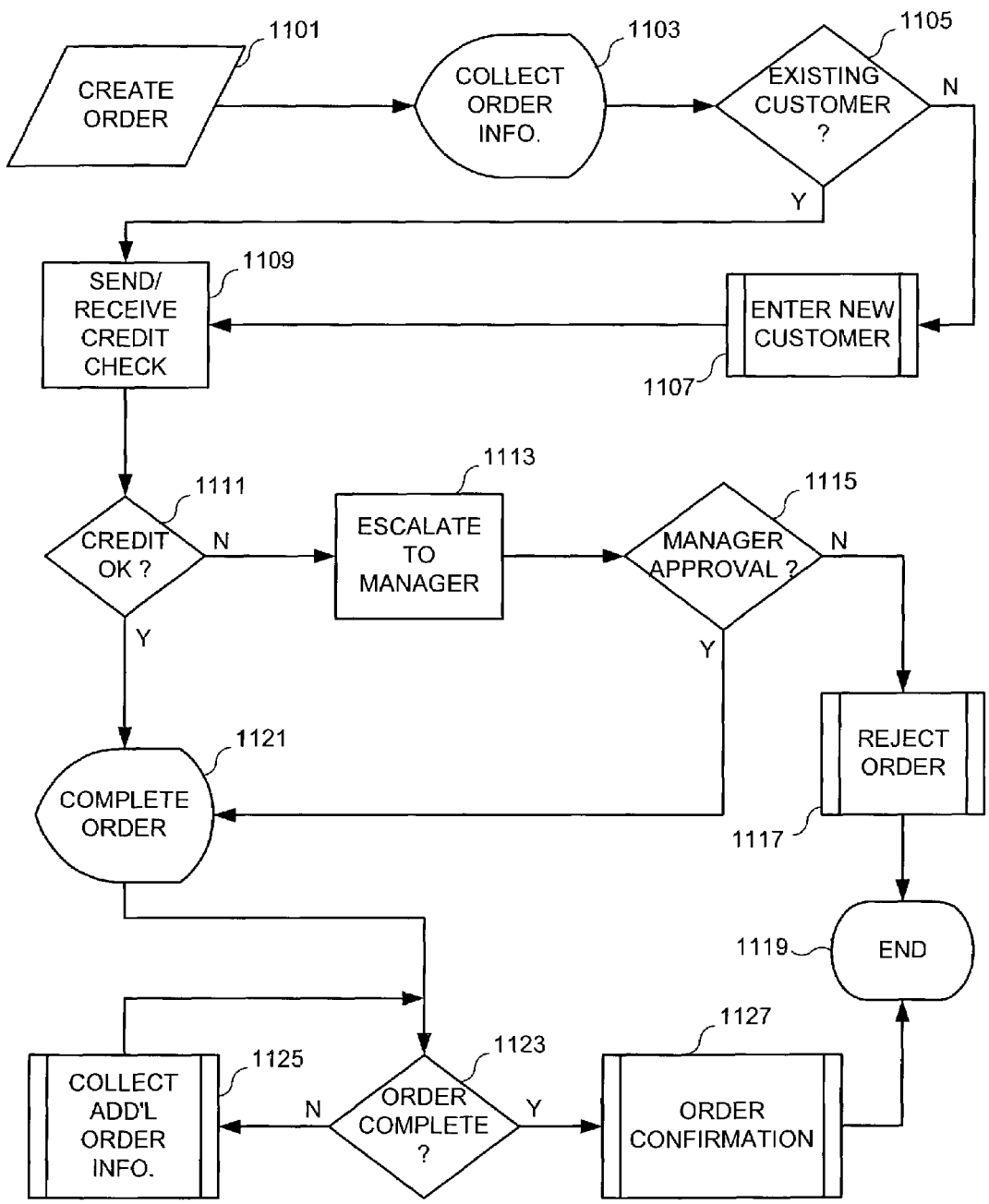
FIG. 11 is a flow diagram illustrating an example workflow process in accordance with an embodiment of the present invention.

For example, in the workflow process illustrated in FIG. 11, the "collect order info." block 1103, representing a user-interact operation, may be defined to navigate a customer to a view in which he or she may input information related to placing an on-line order, such as a name and credit card number. The user-interact operation may be further defined to wait for an event (e.g., by specifying conditions and values in the respective applets 509, 511), such as a button click on a "Submit" button, for example, on the current view with which the customer is interacting, which will take the workflow to the next operation in the workflow process instance (e.g., block 1105). Because the process designer is able to select a desired view from a list of pre-designed views, he or she need not have the expertise required to design the views himself or herself, and any problems associated with attempting to incorporate views across differing execution environments is alleviated.

Figure 6:
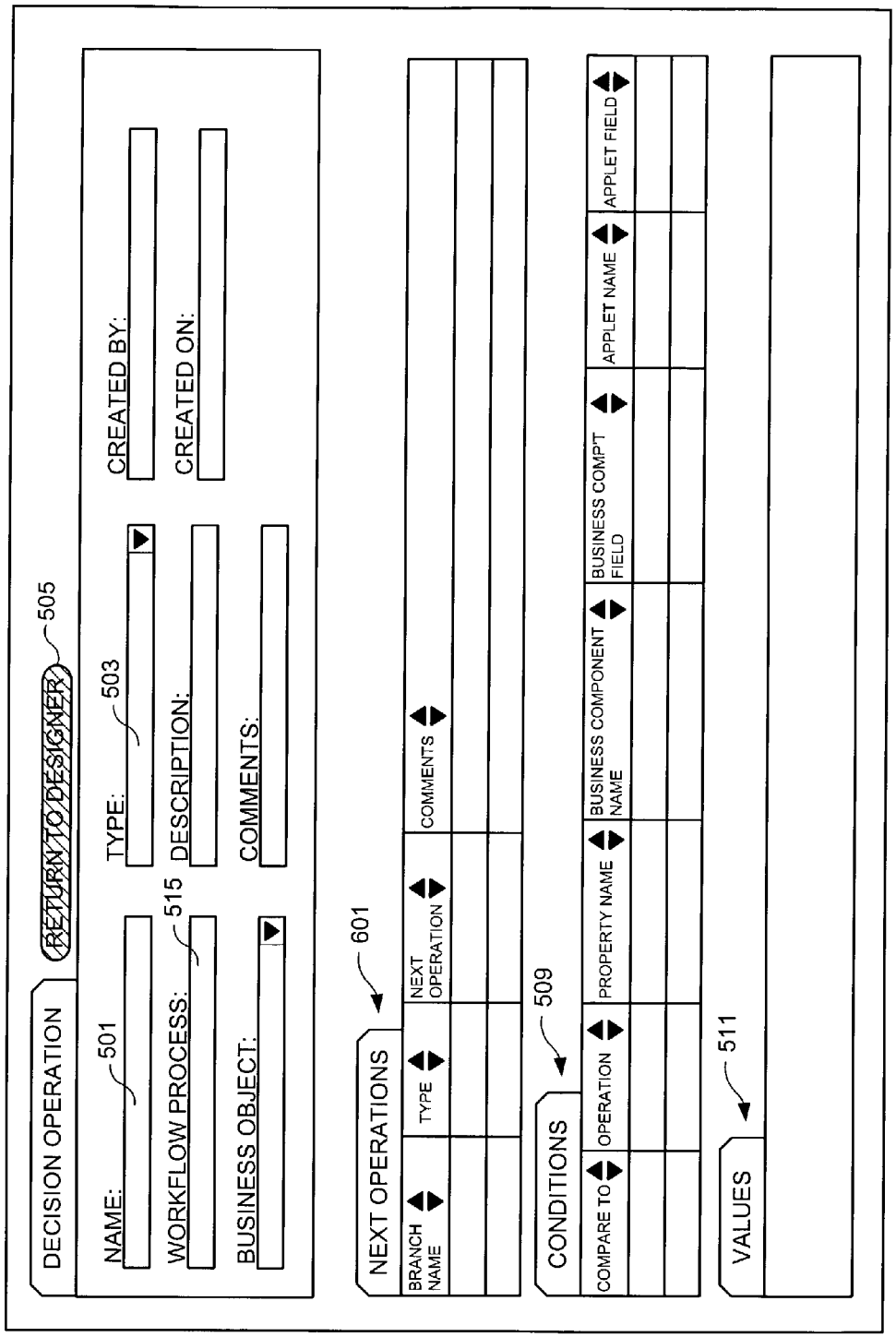
FIG. 6 is an illustration of an example user-interface display showing an administration view of the example workflow editing application to define a decision operation of the workflow process in accordance with an embodiment of the present invention.
Figure 7:
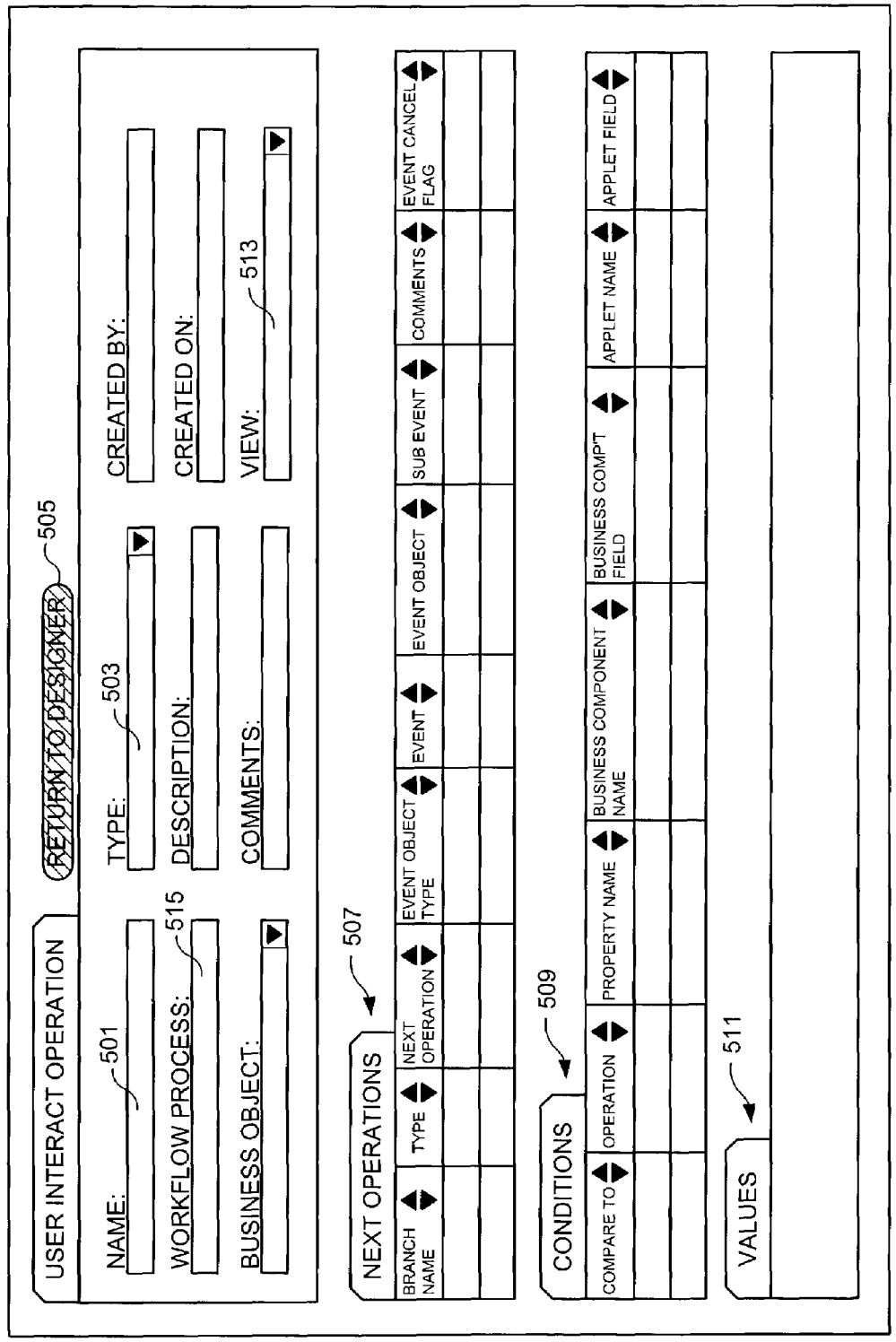
FIG. 7 is an illustration of an example user-interface display showing an administration view of the example workflow editing application to define a user-interact operation of the workflow process in accordance with an embodiment of the present invention.

The next operation in the workflow process illustrated in FIG. 11 is the "existing customer ?" decision point block 1105. An embodiment of an administration view for defining a decision operation is illustrated in FIG. 6. The decision operation administration view illustrated in FIG. 6 may include many of the same data fields as described previously in conjunction with FIGS. 4A, 4B, and 5. In addition, the illustrated administration view includes a next operations applet 601, the conditions applet 509, and the values applet 511 for defining the next operations that may be taken in the workflow process instance, and the conditions and values upon which the branches may be based.

In the illustrated workflow process of FIG. 11, two possible branches exist: a branch leading to an "enter new customer" sub-process operation (e.g., block 1107); or a branch leading to a "send/receive credit check" task operation (e.g., block 1109). If the user is not an existing customer, the branch leading to the "enter new customer" sub-process operation 1107 may be executed for the workflow process instance. Otherwise, the branch leading to the "send/receive credit check" task operation 1109 may be executed by the workflow process manager 115 (see, e.g., FIG. 1) in the application server 113, in an embodiment. Following the "enter new customer" sub-process operation 1107, the workflow process is directed to the "send/receive credit check" task operation 1109 in the illustrated example workflow process.

Figure 8:
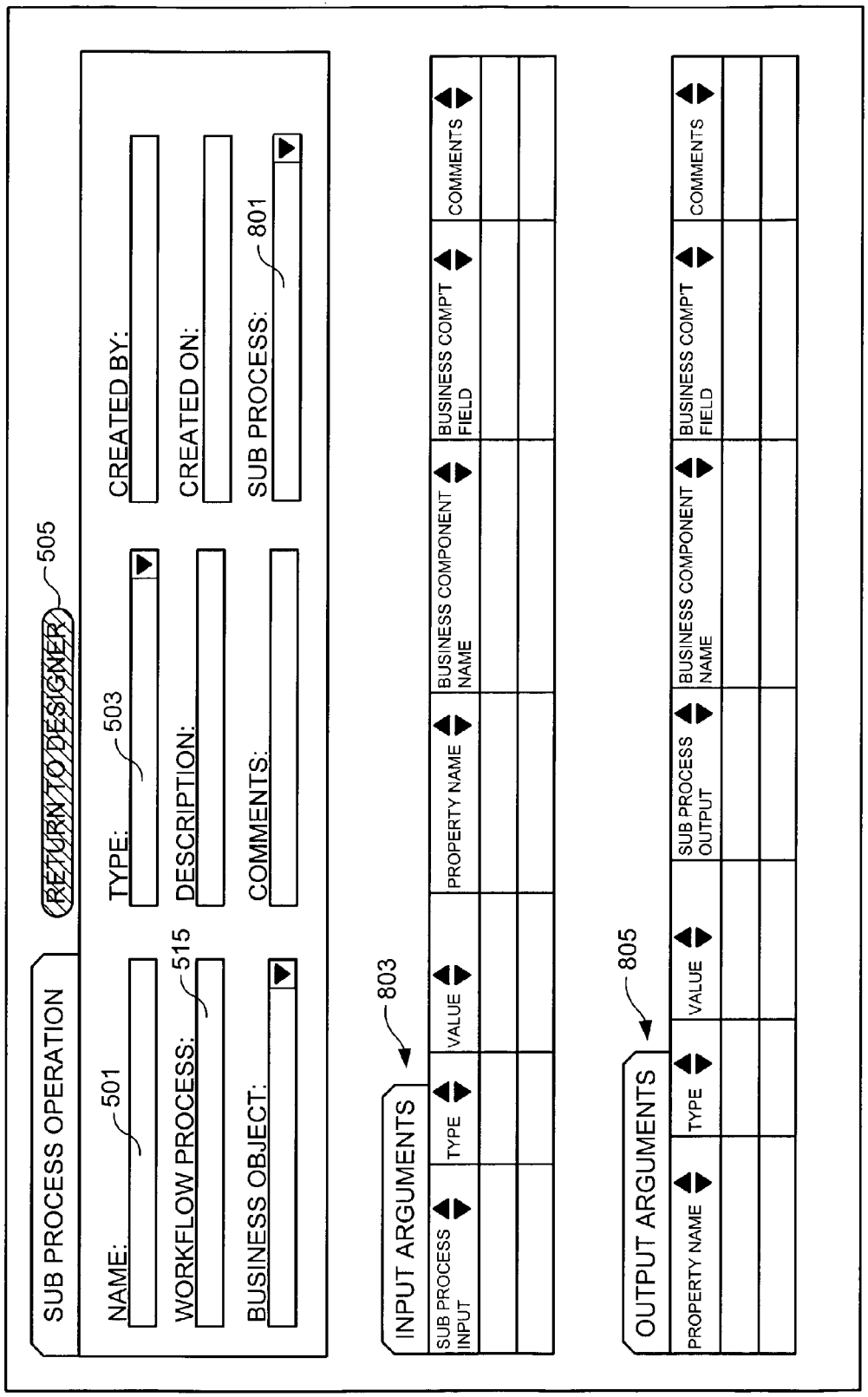
FIG. 8 is an illustration of an example user-interface display showing an administration view of the example workflow editing application to define a sub-process operation of the workflow process in accordance with an embodiment of the present invention.

With reference now primarily to FIG. 8, an example sub-process operation administration view for defining sub-process operations like the "enter new customer" sub-process operation 1107 is illustrated in accordance with an embodiment of the present invention. As mentioned previously, the sub-process operation comprises a workflow process itself, and may be designed and defined in a manner similar to that being described herein for the workflow process illustrated in FIG. 11. The sub-process operation administration view may include many of the same data fields as described previously in conjunction with FIGS. 4A, 4B, and 5. In addition, the sub-process operation administration view may include a data entry field for selecting a "Sub Process" (see, e.g., reference numeral 801), in an embodiment. The "Sub Process" may be selected from a pull-down list, in an embodiment, comprising all available defined workflow processes. If a desired sub-process does not yet exist, the process designer may create the sub-process as a workflow process in a manner similar to that described herein in conjunction with FIGS. 4A and 4B, as well as FIGS. 5-10.

The sub-process may be designed as a series of interconnected operations, each of which may be defined by the process designer to provide functionality to the sub-process. As mentioned previously, it will be appreciated that the defined sub-process may itself comprise one or more other sub-processes. In addition to selecting the desired "Sub Process" via the data entry field 801, the process designer may also define what information/data is to be input to the sub-process, and what information/data is to be retrieved from the sub-process. This information may be entered into the input arguments applet 803 and the output arguments applet 805, respectively, in an embodiment, as provided in the sub-process operation administration view illustrated in FIG. 8.

Figure 9:
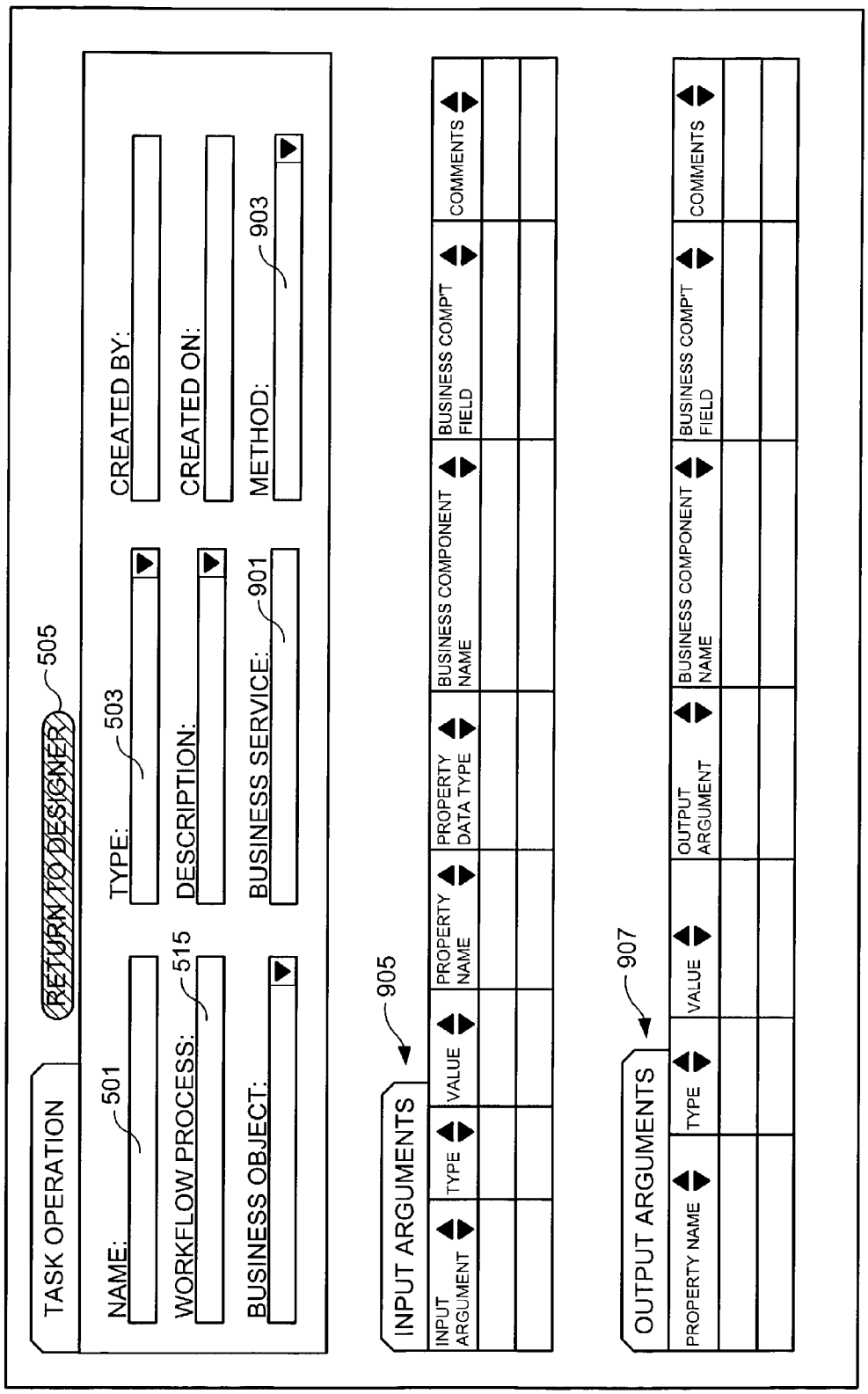
FIG. 9 is an illustration of an example user-interface display showing an administration view of the example workflow editing application to define a task operation of the workflow process in accordance with an embodiment of the present invention.

With reference now primarily to FIG. 9, an embodiment of a task operation administration view for defining task operations like the "send/receive credit check" task operation 1109 is illustrated in accordance with an embodiment of the present invention. In one embodiment, the task operation administration view is similar to the sub-process operation administration view illustrated in FIG. 8, and includes an input arguments applet 905, and an output arguments applet 907. In addition, the task operation administration view comprises a number of data fields as discussed previously in conjunction with FIGS. 4A, 4B, and 5, as well as a "Business Service" field 901 and a "Method" field 903. The process designer may select the desired business service (e.g., notification, assignment, external program call, or the like) from a pull-down list, for example, and select a method by which the business service may be performed.

In the case of the illustrated workflow process, the "send/receive credit check" task operation may comprise a notification business service, performed via a method such as an email sent to a person responsible for performing the credit check, or the task operation may comprise an automated process that calls upon an external program to perform the check and provide the results. In any event, the notification business service or external program call business service may provide an output to the next operation in the defined workflow process (e.g., the "credit ok ?" decision point block 1111).

Figure 10:
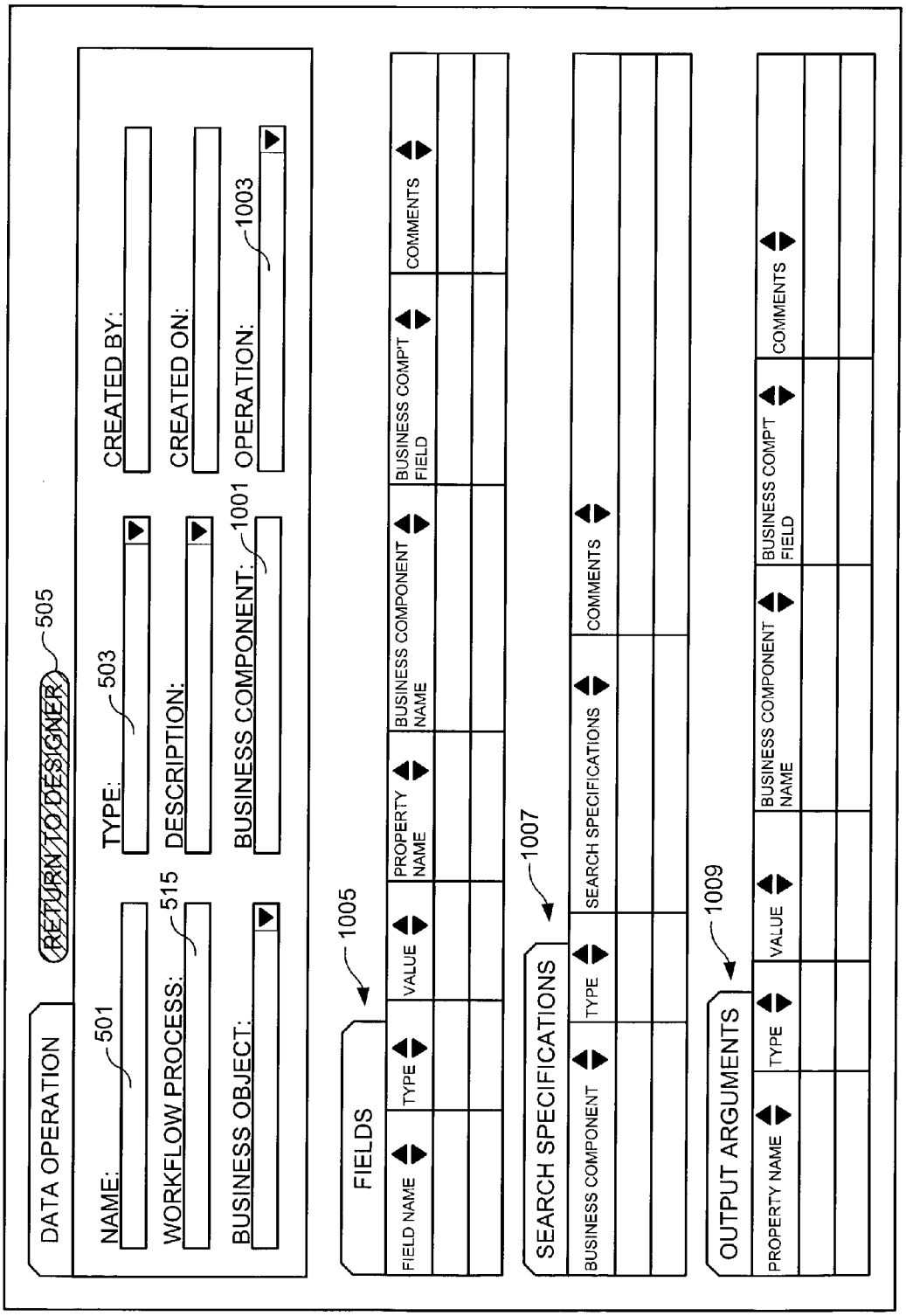
FIG. 10 is an illustration of an example user-interface display showing an administration view of the example workflow editing application to define a data operation of the workflow process in accordance with an embodiment of the present invention.

With reference now primarily to FIG. 10, an example data operation administration view is shown in accordance with an embodiment of the present invention. The data operation administration view may include many of the data entry fields discussed previously in conjunction with FIGS. 4A, 4B, and 5, as well as a "Business Component" field 1001 and an "Operation" field 1003. In one embodiment, a user may select a business component and an operation to be performed from a pull-down list. For example, the process designer may wish to have the workflow update the customer's order before sending/receiving the credit check (e.g., to determine whether the order has been canceled), and may select "orders" form the pull-down list associated with the business component field 1001 and "update" from the pull-down list associated with the operation field 1003. In one embodiment, the data operation administration view further includes a fields applet 1005, a search specifications applet 1007, and an output arguments applet 1007 to allow the process designer to specify the operation to be performed and the output to be returned.

With continued reference to FIG. 11, following the "send/receive credit check" task operation 1109, the workflow process proceeds to another decision operation (e.g., block 1111). The "credit ok ?" decision operation may be defined in a manner similar to that described above, with branches directing the workflow process to another task operation (e.g., block 1113), or to another user-interact operation (e.g., block 1121) based upon the fulfillment of defined conditions. The "escalate to manager" task operation 1113 may comprise an assignment business service, in which an approval for credit is assigned to a manager in response to a negative credit check. If the manager approves credit (see, e.g., "manager approval ?" decision operation 1115), then the workflow process proceeds to the "complete order" user-interact operation 1121. Otherwise, a "reject order" sub-process operation 1117 may be initiated, and the workflow process reaches an end designator 1119.

The "complete order" user-interact operation 1121 may again provide the process designer with an opportunity to navigate the customer (e.g., user) to a specified view selected from a list of pre-designed views related to the particular business object, and to define the conditions or user-initiated events that will trigger the next operation in the workflow process. Following the "complete order" user-interact operation 1121, another decision operation may evaluate whether the order is complete (see, e.g., block 1123). If the order is complete, an "order confirmation" sub-process operation 1127 may be initiated, and the workflow process reaches the end designator 1119. If the order is not yet complete (see, e.g., block 1123), the workflow process proceeds to a "collect additional order info." sub-process operation 1125, and begins an iterative loop until the order is completed, in the illustrated embodiment.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. A method, comprising:
providing a first user-interface to design a workflow process comprising a series of interconnected operations, wherein the first user-interface enables a process designer to select for inclusion in the workflow process a user-interact operation from a plurality of user-interact operations, a decision operation, and a task operation;
providing a second user-interface to define the user-interact operation, wherein the second user-interface comprises a menu that displays a plurality of preexisting web pages that correspond to the user-interact operation that was selected for inclusion into the workflow process, wherein the menu enables the workflow designer to select a web page that will be displayed to a user during an execution of an instance of the workflow process, wherein the selected web page, when displayed, comprises fields for receiving data input from the user;
providing a third user-interface to define the decision operation,
providing a fourth user-interface to define the task operation, wherein the fourth user-interface comprises a menu for selecting the task operation from a plurality of task operations, wherein the task operation comprises a call to an external program, wherein the external program, when called, provides an output to a subsequent operation of the work flow process.

2. The method of claim 1, wherein the method further comprising:
providing yet another additional user-interface to define a sub-task of the workflow process.

3. The method of claim 2, wherein the sub-task comprises at least one of a notification sub-task, an assignment sub-task, or an external program call sub-task.

4. The method of claim 1, wherein the first user-interface comprises a graphical user-interface including at least a palette and a workspace to design the workflow process, the palette including at least a plurality of flowchart shapes representing types of operations that may be incorporated into the workflow process, the plurality of flowchart shapes including a shape to represent the user-interact operation.

5. The method of claim 4, wherein the workflow process may be designed by dragging and by dropping flowchart shapes from the palette to the workspace, and connecting the flowchart shapes on the workspace with a connector.

6. The method of claim 4, wherein the second user-interface is accessed by selection of a flowchart shape from the workspace.

7. The method of claim 6, wherein the second user-interface corresponds to the type of operation represented by the selected flowchart shape.

8. The method of claim 1 wherein the workflow process is compiled.

9. A machine-readable medium that stores executable instructions, which when executed by a computer system, cause the computer system to perform a method, the method comprising:
displaying a first user-interface to design a workflow process comprising a series of interconnected operations wherein the first user-interface enables a process designer to select for inclusion in the workflow process a user-interact operation from a plurality of user-interact operations, a decision operation, and a task operation in the workflow process; and
displaying a second user-interface to define the user-interact operation, wherein the second user-interface comprises a menu that displays a plurality of preexisting web pages that correspond to the user-interact operation that was selected for inclusion into the workflow process, wherein the menu enables the workflow designer to select a web page that will be displayed to a user during an execution of an instance of the workflow process, wherein the selected web page, when displayed, comprises fields for receiving data input from the user;
displaying a third user-interface to define the decision operation;
displaying a fourth user-interface to define the task operation, wherein the fourth user-interface comprises a menu for selecting the task operation from a plurality of task operations, wherein the task operation comprises a call to an external program, wherein the external program, when called, provides an output to a subsequent operation of the work flow process.

10. The machine-readable medium of claim 9, wherein the first user-interface comprises a graphical user-interface including a palette and a workspace to design the workflow process, the palette including a plurality of flowchart shapes representing types of operations that may be incorporated into the workflow process, the plurality of flowchart shapes including a shape to represent the user-interact operation.

11. The machine-readable medium of claim 10, wherein the workflow process may be designed by dragging and dropping flowchart shapes from the palette to the workspace, and by connecting the flowchart shapes on the workspace with a connector.

12. The machine-readable medium of claim 10, wherein the second user-interface is accessed by selection of a flowchart shape from the workspace.

13. The machine readable medium of claim 12, wherein the second user-interface corresponds to the type of operation represented by the selected flowchart shape.

* * * * *